US009904375B1

(12) United States Patent
Donnelly et al.

(10) Patent No.: US 9,904,375 B1
(45) Date of Patent: Feb. 27, 2018

(54) LIDAR DISPLAY SYSTEMS AND METHODS

(71) Applicant: Uber Technologies, Inc., San Francisco, CA (US)

(72) Inventors: Richard Brian Donnelly, Pittsburgh, PA (US); David Patrick Rice, Wexford, PA (US); Philipp Haban, Pittsburgh, PA (US); Thomas Jeffery Watson, Jr., Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/484,073

(22) Filed: Apr. 10, 2017

(51) Int. Cl.
G09G 3/00 (2006.01)
G06F 3/0346 (2013.01)
G01S 7/51 (2006.01)
G06Q 30/02 (2012.01)

(52) U.S. Cl.
CPC ............. *G06F 3/0346* (2013.01); *G01S 7/51* (2013.01); *G06Q 30/0261* (2013.01)

(58) Field of Classification Search
CPC ..... G06F 3/0346; G01S 17/023; G09G 3/005; B60Q 1/2611
See application file for complete search history.

(56) References Cited

U.S. PATENT DOCUMENTS

| 6,812,851 | B1* | 11/2004 | Dukach ................. G06Q 30/02 340/425.5 |
| 8,954,252 | B1* | 2/2015 | Urmson ................. G08G 1/166 180/167 |
| 9,494,938 | B1* | 11/2016 | Kemler ................ G05D 1/0088 |
| 2002/0005826 | A1* | 1/2002 | Pederson ............. B60Q 1/2611 345/82 |
| 2003/0144906 | A1* | 7/2003 | Fujimoto ........... G06Q 30/0265 705/14.62 |
| 2004/0056779 | A1* | 3/2004 | Rast ........................ B63B 22/16 340/985 |
| 2005/0083403 | A1* | 4/2005 | Flores .................... H04N 7/183 348/61 |
| 2010/0053715 | A1* | 3/2010 | O'Neill ................ G02B 26/105 359/199.3 |
| 2010/0157173 | A1* | 6/2010 | Wang ............... G08B 13/19619 348/744 |
| 2012/0137256 | A1* | 5/2012 | Lalancette .......... G06F 21/6263 715/846 |
| 2012/0166078 | A1* | 6/2012 | Choi .................. G01C 21/3661 701/436 |
| 2015/0055117 | A1* | 2/2015 | Pennecot ................ G01S 17/89 356/4.01 |

* cited by examiner

*Primary Examiner* — Dorothy Harris
(74) *Attorney, Agent, or Firm* — Dority & Manning, P.A.

(57) ABSTRACT

Systems and methods for displaying imagery on a Light Detection and Ranging (LIDAR) system are provided. In one example embodiment, a method includes determining, by the one or more computing devices, a rotational frequency of a LIDAR device located on a vehicle. The method includes illuminating, by the one or more computing devices, one or more of a plurality of light emitting elements coupled to the LIDAR device based at least in part on the rotational frequency of the LIDAR device and the one or more images for display.

20 Claims, 13 Drawing Sheets

LIDAR DISPLAY SYSTEMS AND METHODS

FIELD

The present disclosure relates generally to displaying imagery on a Light Detection and Ranging (LIDAR) system.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. One such sensor is a Light Detection and Ranging (LIDAR) system. A LIDAR system can include a laser device that emits laser pulses while rotating.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method that includes receiving, by one or more computing devices, one or more images for display. The method includes determining, by the one or more computing devices, a rotational frequency of a LIDAR device located on a vehicle. The method includes illuminating, by the one or more computing devices, one or more of a plurality of light emitting elements coupled to the LIDAR device based at least in part on the rotational frequency of the LIDAR device and the one or more images for display.

Another example aspect of the present disclosure is directed to a computing system for displaying imagery. The system includes one or more processors and one or more tangible, non-transitory, computer readable media that collectively store instructions that when executed by the one or more processors cause the computing system to perform operations. The operations include receiving one or more images for display. The operations include determining a rotational frequency of a LIDAR device located on a vehicle. The operations include illuminating one or more of a plurality of light emitting elements coupled to the LIDAR device based at least in part on the rotational frequency of the LIDAR device and the one or more images for display.

Yet another example aspect of the present disclosure is directed to a display apparatus. The display apparatus includes one or more support elements configured to be coupled to a LIDAR device capable of rotational movement. The display apparatus includes a plurality of light emitting elements coupled to the one or more support elements. The display apparatus includes one or more controllers in communication with the plurality of light emitting elements and configured to cause one or more of the plurality of light emitting elements to illuminate for display based at least in part on a rotational frequency of the LIDAR device.

Other example aspects of the present disclosure are directed to systems, methods, vehicles, apparatuses, tangible, non-transitory computer-readable media, user interfaces, and memory devices for displaying imagery.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
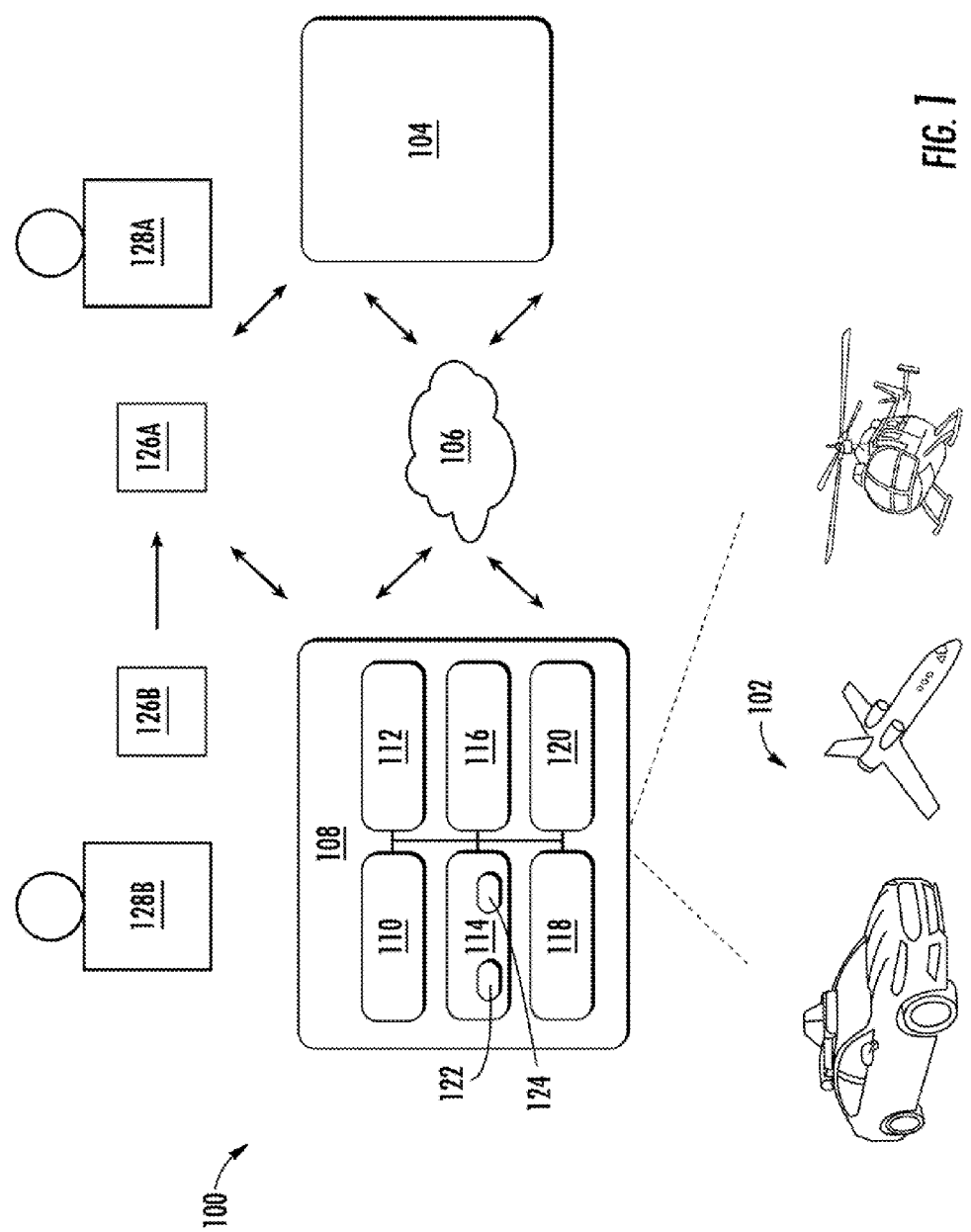
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to displaying imagery on a Light Detection and Ranging (LIDAR) system. More particularly, one or more light emitting elements can be located on a rotatable surface of a LIDAR system and can be illuminated to create imagery for display on the LIDAR system. A rotational frequency of the LIDAR system can be used to determine appropriate light emitting elements to illuminate during rotation of the LIDAR system to result in display of the desired imagery.

LIDAR systems can be used to acquire sensor data associated with the environment of a vehicle, such as an autonomous vehicle (e.g., a ground-based vehicle, air-based vehicle, other vehicle type), to help perceive the vehicle's surroundings. A LIDAR system can include a laser device that emits laser pulses while rotating such that the sensor data can include the location (e.g., in three-dimensional space relative to the LIDAR system in the field of rotation) of a number of points that correspond to objects that have reflected the laser pulses emitted by the LIDAR system. Rotation of the LIDAR system allows for imagery to be created by positioning light emitting elements on the LIDAR system and illuminating such elements at frequencies that match or harmonize with a rotational frequency of the LIDAR system. Rotation of light emitting elements around a common axis can enable the impression of imagery being displayed on a surface through persistence of vision. Persistence of vision refers to the optical illusion that occurs when visual perception of an object does not cease for some time after the rays of light proceeding from it have ceased to enter the eye. In this manner, imagery can be displayed by light emitting elements on any rotatable surface of the LIDAR system.

As described herein, light emitting elements can be any suitable light emitting elements such as light emitting diodes (LEDs) or the like and may or may not be in the visible light spectrum. The light emitting elements can be joined to one or more support elements or can be joined directly to a LIDAR system. The light emitting elements and/or support element(s) can be joined to a rotatable surface of the LIDAR system. In certain embodiments, the light emitting elements may be located on or near an exterior surface of the LIDAR system. In some embodiments, the light emitting elements may be located within an interior portion of the LIDAR system and project outwards towards the exterior surface of the LIDAR system.

In certain aspects of the present disclosure, one or more controllers can cause one or more of the plurality of light emitting elements to illuminate for display based at least in part on a rotational frequency of the LIDAR device. For instance, in embodiments in which one or more of the light emitting elements are LEDs, one or more controllers can send one or more signals to one or more drivers associated with one or more respective LEDs, to illuminate such LEDs.

Imagery displayed on the LIDAR system described herein can be utilized, for example, with a service, such as an on-demand service or the like. Aspects of the present disclosure are capable of providing displayed imagery for example, on or within a vehicle operated by a service provider (e.g., a transport service provider, a delivery provider, or the like). The imagery can be positioned to be easily visible to a user of the vehicle, bystander, other drivers, or the like. As further described herein, information specified or configured by a user of a service can be used to create and/or select imagery to be displayed, such as through an application accessible to a user through a user device. For instance, a user can be provided with an option in an application on a user device to determine and/or choose imagery to be displayed. In certain aspects of the present disclosure, the imagery can be selected from a library of existing imagery and/or created, at least in part, based on such imagery. In certain aspects of the present disclosure, the imagery can be created by a user. Examples of two-dimensional or three-dimensional features that can be specified and/or configured/created by a user include a color(s), a pattern(s), an illumination sequence(s), text, visual content (e.g., avatars, emojis, logos, icons, or the like), video, and/or audio. In this manner, when a vehicle associated with the service provider approaches a user for purposes of providing the service, the imagery can be dynamically configured and personalized in a manner specified and recognizable by the user, thereby informing the user, bystander(s), and/or other vehicles which vehicle has been assigned to the user to provide the service.

Similarly, imagery displayed on the LIDAR system can be used to determine what is displayed to a user through an application on a user device. For example, if the LIDAR system displays an image, the color of such image on LIDAR system can match a color displayed on associated application on a user device.

Additionally, or alternatively, to the aforementioned examples, the imagery can be utilized to provide one or more other indications as further described herein. In some aspects of the present disclosure, the imagery can provide an indication as to which seat and/or door a user should enter the vehicle from, such as in the case of when the vehicle is part of a car pool and/or to direct a user to the safest entry point due to traffic or other conditions. In some aspects of the present disclosure, the imagery can provide an indication as to the current pricing for the service, such as increased pricing due to demand, or the like. In certain aspects of the present disclosure, the imagery can be configured to provide access to the vehicle, such as a pin code, QR code, pass key, or the like, which can be entered into a user device (e.g., mobile device, wearable device, or the like) in communication with one or more vehicle control system(s) to authenticate the user. For instance, a user can scan a QR code using a user device to unlock a door to the vehicle. In certain aspects of the present disclosure, a user can submit messages (e.g., through a user interface in the vehicle, user device, or the like) which can be displayed by the imagery. In certain aspects of the present disclosure, a first name or other identification (associated with a user and/or associated with an intended rider, such as a rider for whom as user has ordered the service) can be displayed by the imagery so as to not require a user and/or rider to review a user device to identify the vehicle. Although the terms "user" and "rider" are used separately in the above example, the term "user" as used throughout the present description is intended to include rider(s).

Imagery displayed on the LIDAR system described herein can also, or alternatively, be based on a surrounding environment of the vehicle and/or a status of the vehicle and/or one or more vehicle systems. For example, imagery can provide courtesy or safety information to users, bystanders, other drivers, or the like. Such information can include, for example, intended destination, pricing information, expected time of arrival to a destination, cross-walk signals (such as an indication that it is safe to walk in front of the vehicle), stop signals, turn signals, messages and/or signaling that the vehicle is going to stop and pick up a user, other safety messages and/or signaling, information about the city or locality (e.g., city maps, landmarks, sports teams, or the like), artwork, news, advertising, or the like.

As contemplated herein, one or more of the aforementioned examples can be displayed at a fixed location on the LIDAR system, move at fixed and/or random intervals across different location on the LIDAR system and/or scroll across a region and/or the entire circumference of the LIDAR system (e.g. scrolling message or the like). In this manner, a single image or different imagery can be displayed on the LIDAR system.

As described herein, a LIDAR system and/or other sensors are configured to acquire sensor data associated with the surrounding environment of the autonomous vehicle. The LIDAR system can include various types of emitters and/or detectors, such as various types of lasers and photometric detectors. The LIDAR system can emit (e.g., over 360 degrees by rotation) ranging lasers, such as focused, low-power beams of light of a specified wavelength, and can detect and record the reflection of such wavelengths of light from various objects. The LIDAR system can acquire the sensor data in real-time, as the autonomous vehicle is in motion and can provide the sensor data to the vehicle computing system for processing. In certain aspects of the present disclosure, a rotational frequency of the LIDAR system can be determined by the vehicle computing system and can be utilized to determine the appropriate light emitting elements to illuminate during rotation of the LIDAR system to result in display of the desired imagery. For example, in certain aspects of the present disclosure, active determination (e.g., measuring the real-time rotation of the LIDAR system and controlling illumination of one or more of the light emitting elements based on the measured rotation) can be utilized. In certain aspects of the present disclosure, passive determination (e.g., using a predetermined or preset rotational frequency for the rotation of the LIDAR system, even if the LIDAR system fluctuates from such predetermined/preset rotational frequency) can be utilized.

The systems, methods, and vehicles described herein may provide a number of technical effects and benefits. For instance, the rotational elements of a LIDAR system can be leveraged to provide imagery through light emitting elements positioned thereon. Due to the positioning of the LIDAR system at a prominent location on a vehicle where 360 degrees views by rotation are available, imagery presented can be readily viewable by users, bystanders, and/or other drivers. In addition, existing vehicle computing systems that can require a rotational velocity of the LIDAR system can be utilized to provide such rotational velocity information to control illumination of one or more light emitting elements. As such, the vehicle computing system can provide an accurate, real-time representation through imagery to users of the vehicle, bystanders, and/or other drivers. This can help improve trust associated with the autonomous vehicle as it autonomously navigates (without human interaction) to a destination point.

The systems, methods, and vehicles described herein also provide an improvement to vehicle computing technology. For instance, aspects of the present disclosure enable a vehicle computing system to more accurately represent imagery based on utilization of the LIDAR system.

With reference now to the FIGS., example embodiments of the present disclosure will be discussed in further detail. FIG. 1 depicts an example system 100 according to example embodiments of the present disclosure. The system 100 can include a vehicle 102, one or more remote computing device(s) 104, and/or one or more user device(s) 126A-B. The remote computing device(s) 104 can be associated with a vehicle owner, a fleet operator, maintenance and/or monitoring entity, a central operations computing system, and/or another entity that is associated with the vehicle 102. Additionally, or alternatively, the entity can be a service provider that provides one or more vehicle service(s) to a plurality of users via a fleet of vehicles that includes, for example, the vehicle 102. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc. The one or more user device(s) can be associated with a user or party associated with the aforementioned services.

The remote computing device(s) 104 and/or one or more user device(s) 126A-B can include multiple components for performing various operations and functions. For example, the remote computing device(s) 104 and/or one or more user device(s) 126A-B can include and/or otherwise be associated with one or more computing device(s) that are remote from the vehicle 102. The one or more computing device(s) can include one or more processor(s) and one or more memory device(s). The one or more memory device(s) can store instructions that when executed by the one or more processor(s) cause the one or more processor(s) to perform operations and functions (e.g., for monitoring, communicating with the vehicle 102).

Figure 2:
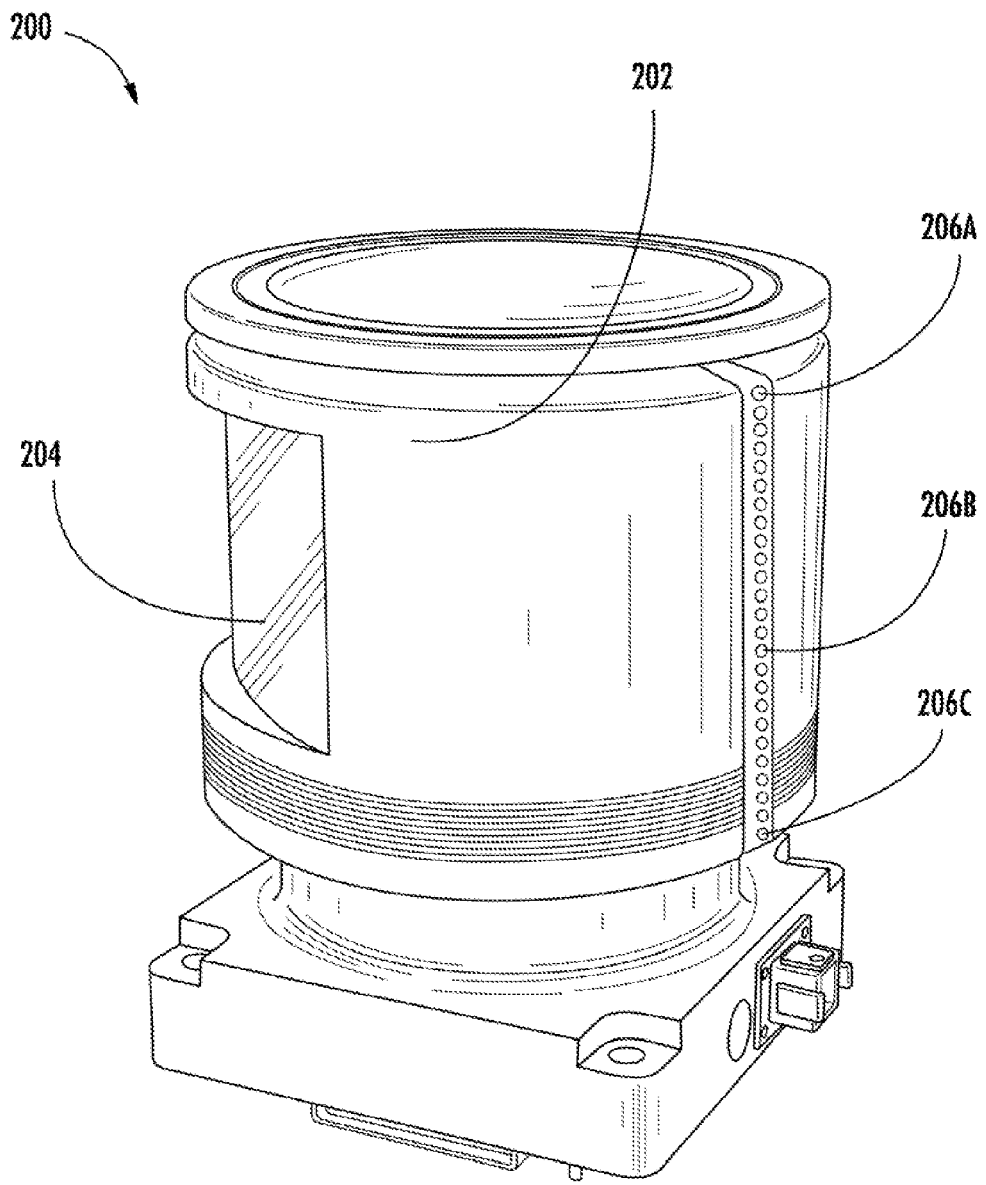
FIG. 2 depicts a LIDAR system according to example embodiments of the present disclosure.

Referring to FIG. 2, an exemplary LIDAR system 200 is illustrated. The LIDAR system 200 includes a scanning device (not shown) contained within housing 202. One or more lenses 204 can be positioned in front of the emitter/detectors (not shown) of the scanning device in order to focus the outgoing laser light and the returned light. The housing 202 can be positioned and configured so that it can be driven by a motor (not shown) to rotate about the vertical axis that is perpendicular to the emitter/detectors. Accordingly, when the device rotates the emitter/detectors each pass across a target along a horizontal plane. As described herein, a plurality of light emitting elements 206A-B-C can be positioned on the rotatable housing 202 of the LIDAR system 200. The light emitting elements can be joined to one or more support elements (not shown) or can be joined directly to a LIDAR system.

Figure 4A:
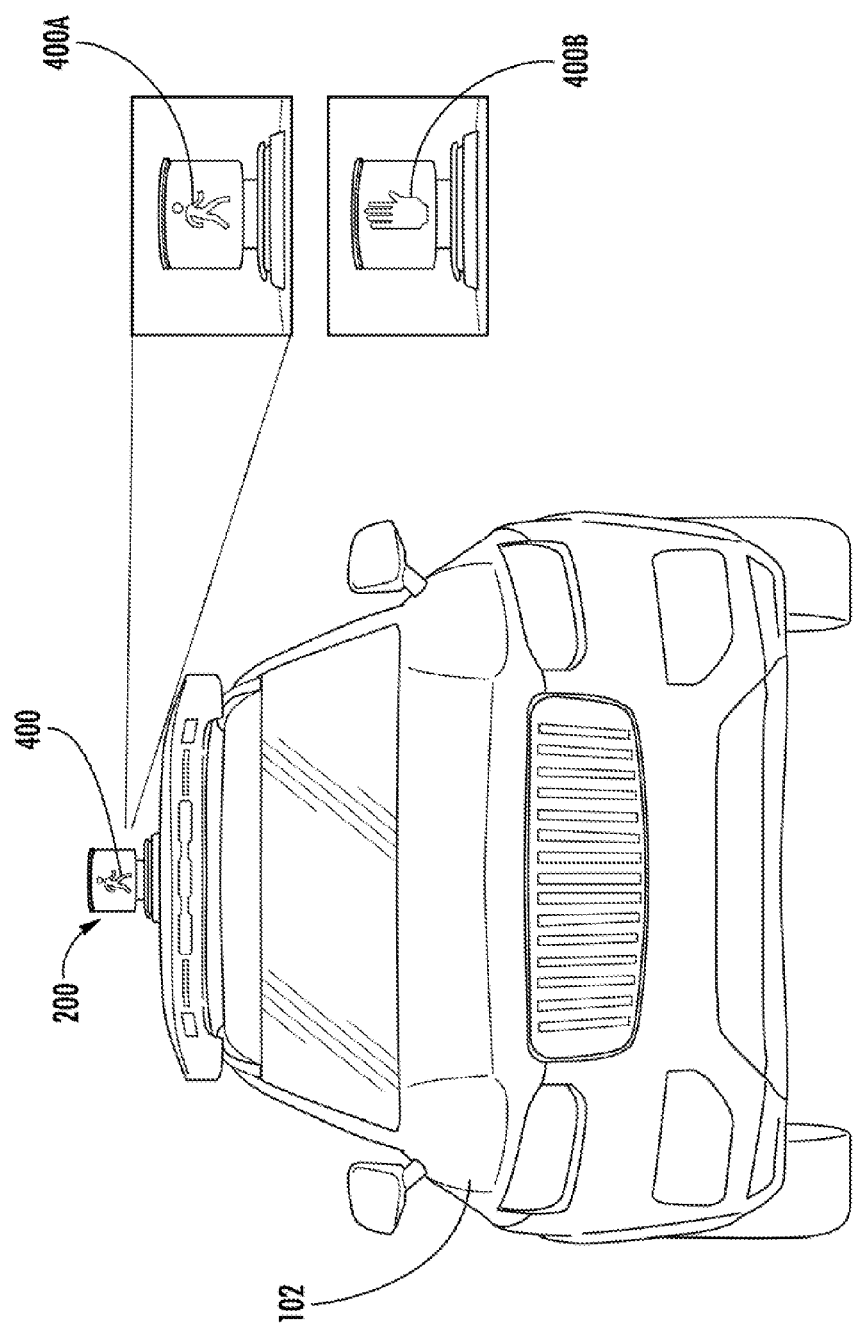
FIG. 4A depicts imagery on a LIDAR system on a vehicle according to example embodiments of the present disclosure.
Figure 4B:
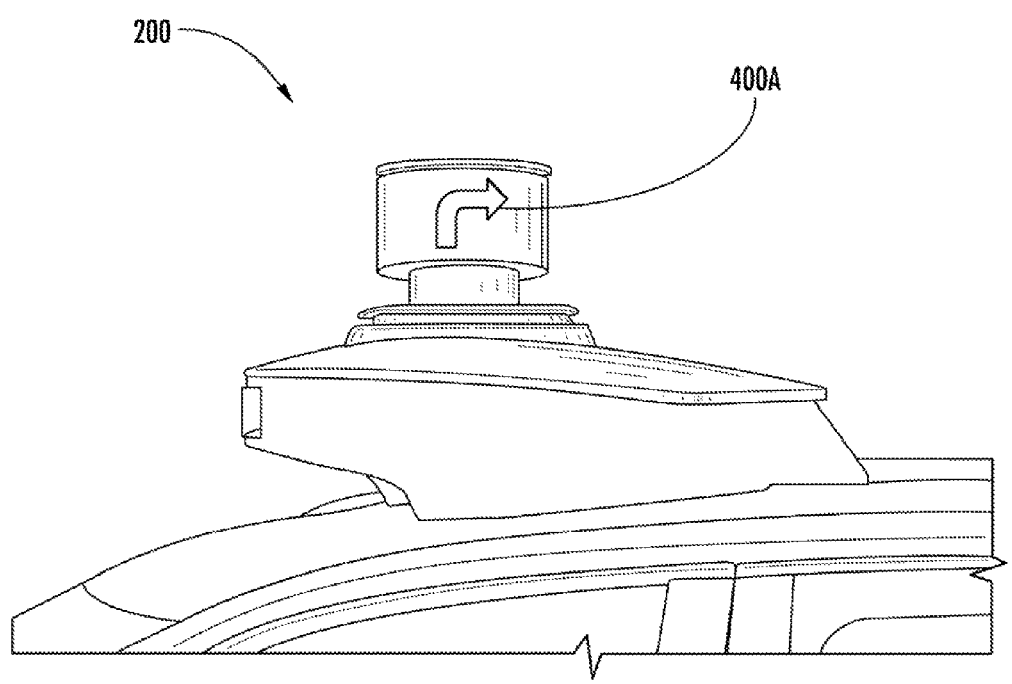
FIGS. 4B-4H depict imagery on a LIDAR system according to example embodiments of the present disclosure.
Figure 4C:
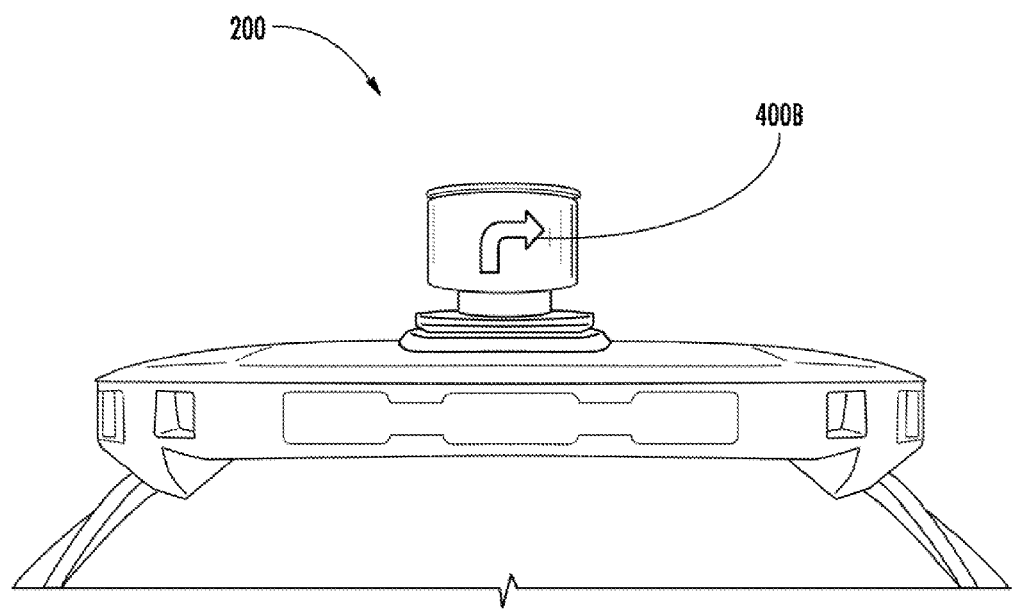

Referring to FIG. 4A, LIDAR system 200 is shown on vehicle 102. Imagery 400 displayed on the LIDAR system 200 can be based on a surrounding environment of the vehicle and/or a status of the vehicle and/or one or more vehicle systems. For example, imagery 400 can provide courtesy or safety information to users, bystanders, other drivers, or the like (e.g., a cross-walk signal, such as an indication that it is safe to walk in front of the vehicle as shown in 400A or a stop signal as shown in 400B). As described herein, imagery 400 can be displayed on one or more portions of the LIDAR system (e.g., turn signal 400A provided on side of LIDAR system relative to side of vehicle as shown in FIG. 4B and/or turn signal 400B provided on front of LIDAR system relative to front of vehicle as shown in FIG. 4C). Referring to FIG. 4H, imagery 400 can be displayed alerting a user to the presence of an open door (e.g., when a user is departing a vehicle).

Referring again to FIG. 1, the remote computing device(s) 104 and/or one or more user device(s) 126A-B can communicate with the vehicle 102 via one or more communications network(s) 106. The communications network(s) 106 can include various wired and/or wireless communication mechanisms (e.g., cellular, wireless, satellite, microwave, and radio frequency) and/or any desired network topology (or topologies). For example, the communications network(s) 106 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102. The one or more user device(s) 126A-B can also be configured to communicate directly with the vehicle 102 via technologies and/or protocols such as those for shorter range communications (e.g., via Bluetooth protocol, near-field communication).

The vehicle 102 can be a ground-based vehicle (e.g., an automobile, truck, bus), an aircraft, and/or another type of vehicle. The vehicle 102 can be an autonomous vehicle that can drive, navigate, operate, etc. with minimal and/or no interaction from a human driver.

The vehicle 102 can include a vehicle computing system 108 that implements a variety of systems on-board the vehicle 102. The vehicle computing system 108 can include one or more computing device(s) for implementing the systems. For instance, the vehicle computing system can include a communications system 110, one or more human machine interface system(s) 112, one or more data acquisition system(s) 114, an autonomy system 116, one or more vehicle control component(s) 118, and a "drive-by-wire" control system 120. One or more of these system(s) can be configured to communicate with one another via a communication channel. The communication channel can include one or more data bus(es) (e.g., controller area network (CAN), on-board diagnostics connector (e.g., OBD-II), and/or a combination of wired and/or wireless communication links). The on-board systems can send and/or receive data, messages, signals, etc. amongst one another via the communication channel.

The communications system 110 can be configured to allow the vehicle computing system 108 (and its subsystems) to communicate with other computing devices. For example, the vehicle computing system 108 can use the communications system 110 to communicate with the remote computing device(s) 104 and/or one or more user device(s) 126A-B over the network(s) 106 (e.g., via one or more wireless signal connections). The communications system 110 can include any suitable components for interfacing with one or more network(s), including for example, transmitters, receivers, ports, controllers, antennas, or other suitable components that can help facilitate communication with one or more remote computing device(s) that are remote from the vehicle 102.

The vehicle computing system 108 and/or remote computing device(s) 104 can receive, from a user device 126A associated with a user 128A, data indicative of a request for access to a vehicle. The request can include, for example, a service request to use one of the service provider's vehicles for the provided services (e.g., rideshare, courier) and/or a request to access a vehicle to provide maintenance (e.g., at a service depot). The user 128A can be a user that has downloaded a software application associated with the service provider, a user that has made a service request with the service provider, a user that is a customer of the service provider, a user that has registered with (e.g., signed-up with, has an account with, has a profile with, has subscribed to) the service provider, etc. In some aspects of the present disclosure, the imagery can provide an indication as to the current pricing for the service, such as increased pricing due to demand, or the like. In certain aspects of the present disclosure, information specified or configured by a user 128A can be used to create and/or select imagery to be displayed.

Figure 4D:
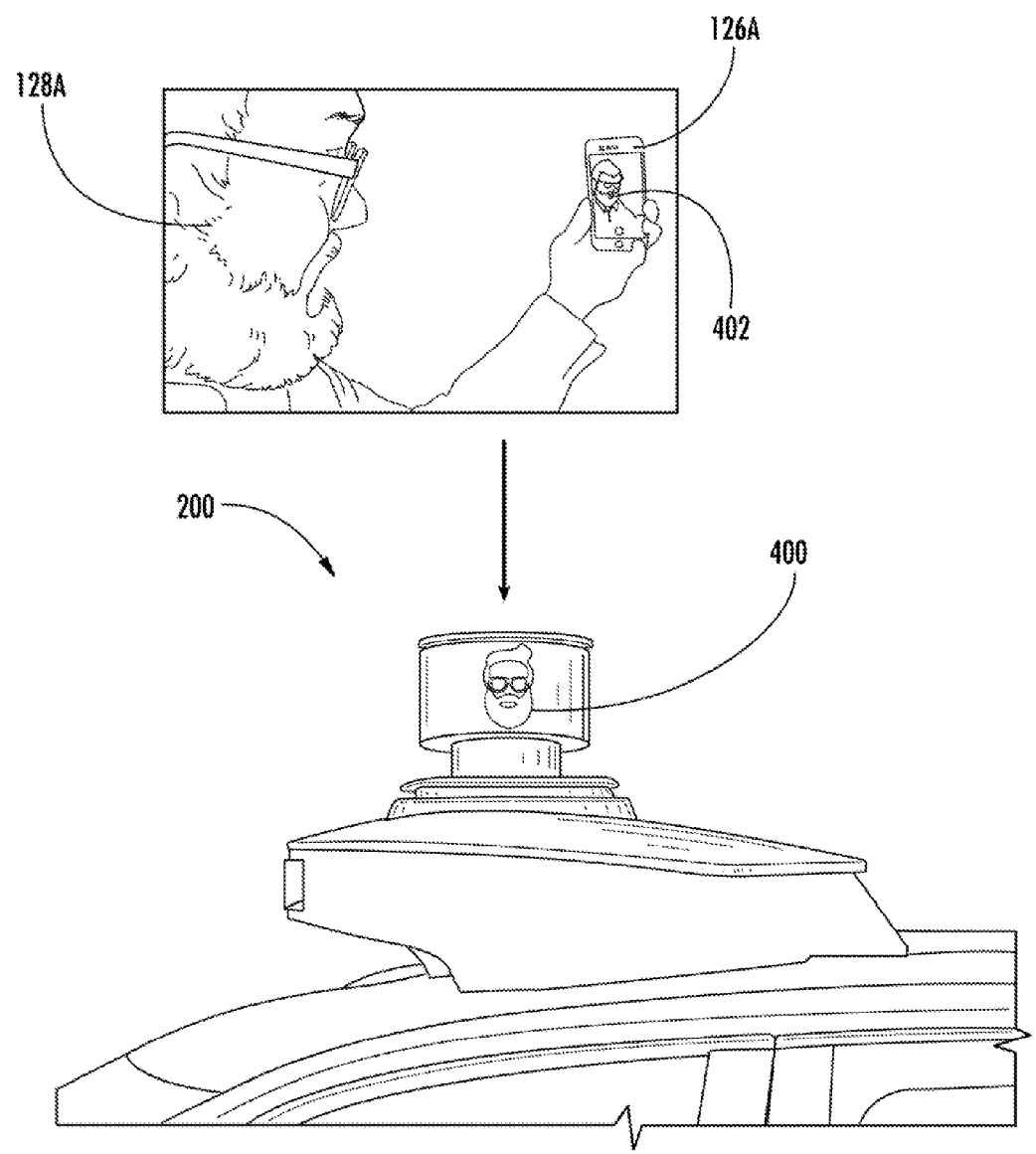

Referring to FIG. 4D, user 128A can capture an image 402 using user device 126A which can be utilized by vehicle computing system 108 and/or remote computing device(s) 104 to display imagery 400 associated with image 402. Imagery 400 can be created by any suitable methods as would be understood by one of ordinary skill in the art and can approximate the image 402 captured by user device 126A. In this manner, a vehicle 102 can readily be identified by a user 128A. In addition, vehicle 102 can be personalized to include imagery 402 selected by user 128A to distinguish vehicle 102 from other vehicles.

Figure 4E:
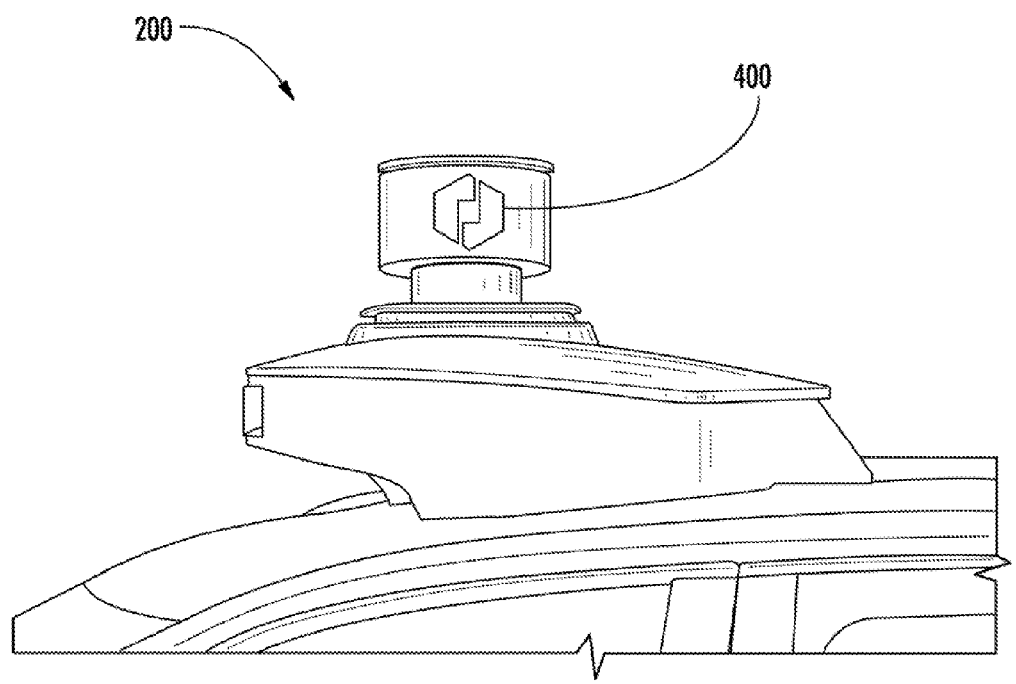
Figure 4F:
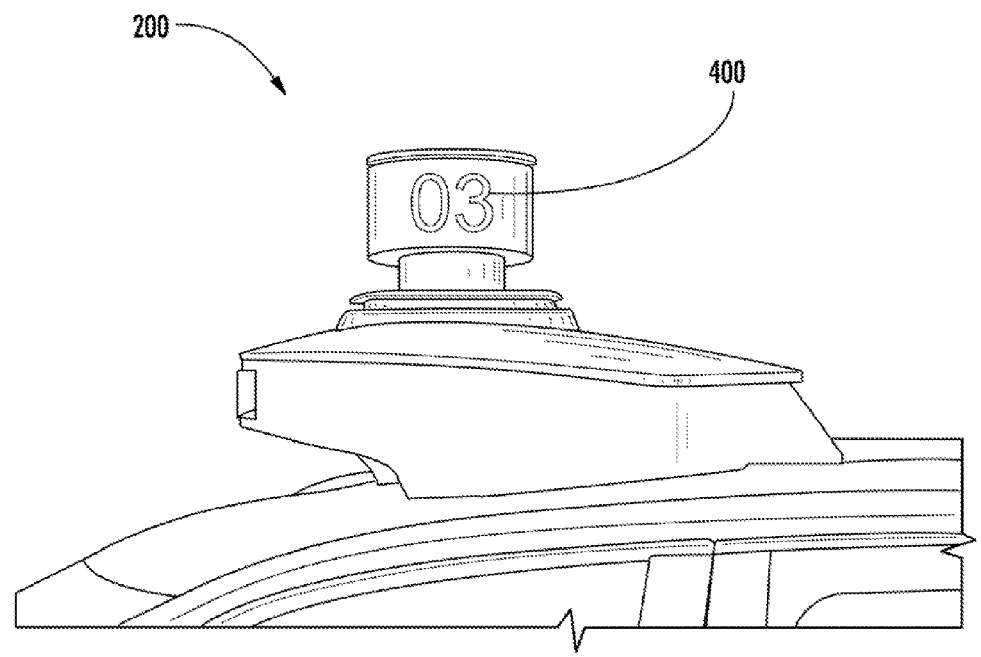
Figure 4G:
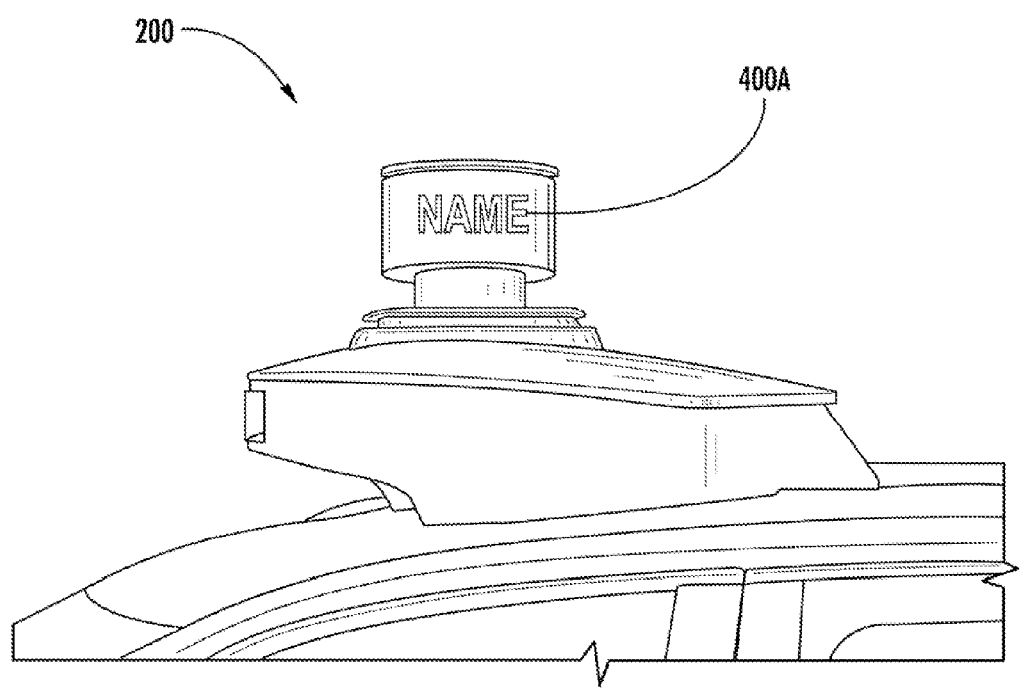
Figure 4H:
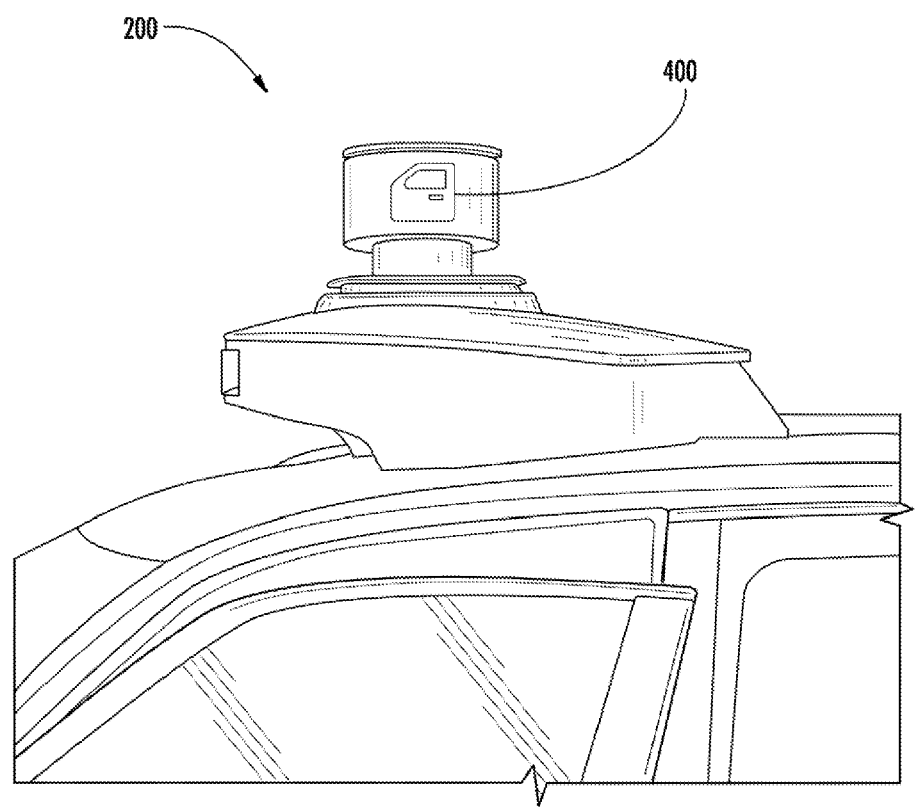

Referring to FIGS. 4E and 4F, other exemplary types of imagery 400 are presented. For example, as depicted in FIG. 4E, imagery 400 can present advertising and FIG. 4F, imagery 400 can present information, such as a number that enables identification of a vehicle associated with such imagery. In certain embodiments, as depicted in FIG. 4G, imagery 400 can present information, such as a name, that allows a user to identify a vehicle associated with such imagery.

The human machine interface system(s) 112 can be configured to allow interaction between a user 128A (e.g., human) and the vehicle 102 (e.g., the vehicle computing system 108). The human machine interface system(s) 112 can include a variety of interfaces for the user to input and/or receive information from the vehicle computing system 108. The human machine interface system(s) 112 can include one or more input device(s) (e.g., touchscreens, keypad, touchpad, knobs, buttons, sliders, switches, mouse, gyroscope, microphone, other hardware interfaces) configured to receive user input. The human machine interface system(s) 112 can include a user interface (e.g., graphical user interface, conversational and/or voice interfaces, chatter robot, gesture interface, other interface types) for receiving user input. The human machine interface(s) 112 can also include one or more output device(s) (e.g., display devices, speakers, lights) to output data associated with the interfaces. In certain aspects of the present disclosure, a user can submit messages (e.g., through the human machine interface system(s) 112) which can be displayed by the imagery.

The data acquisition system(s) 114 can include various devices configured to acquire data associated with the vehicle 102. This can include data associated with one or more of the vehicle's system(s) (e.g., health data), the vehicle's interior, the vehicle's exterior, the vehicle's surroundings, the vehicle users (e.g., driver, passenger), etc. The data acquisition system(s) 114 can include, for example, one or more image capture device(s) 122. The image capture device(s) 122 can include one or more LIDAR systems. Rotation of the LIDAR system allows for imagery to be created by positioning light emitting elements on the LIDAR system. Rotation of light emitting elements around a common axis can enable the impression of imagery being displayed on a surface through persistence of vision. In this manner, imagery can be displayed by light emitting elements on any rotatable surface of the LIDAR system.

The image capture device(s) 122 can additionally or alternatively include one or more camera(s), two-dimensional image capture devices, three-dimensional image capture devices, static image capture devices, dynamic (e.g., rotating) image capture devices, video capture devices (e.g., video recorders), lane detectors, scanners, optical readers, electric eyes, and/or other suitable types of image capture devices. The image capture device(s) 122 can be located in the interior and/or on the exterior of the vehicle 102. The one or more image capture device(s) 122 can be configured to acquire image data to be used for operation of the vehicle 102, for example, in an autonomous mode.

Additionally, or alternatively, the data acquisition systems 114 can include one or more sensor(s) 124. The sensor(s) 124 can include impact sensors, motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data associated with the vehicle 102. The data acquisition systems 114 can include one or more sensor(s) 124 dedicated to obtaining data associated with a particular aspect of the vehicle 102, such as, the vehicle's door locks, turn signals, brake lights, fuel tank, engine, oil compartment, wipers, etc. The sensor(s) 124 can also, or alternatively, include sensor(s) associated with one or more mechanical and/or electrical components of the vehicle 102. For example, one or more of the sensor(s) 124 can be configured to detect whether a vehicle door is in an open or closed position, the vehicle's available data storage, the vehicle's charge level, etc. Imagery displayed on the LIDAR system described herein can be based on a status of the vehicle and/or one or more vehicle systems (e.g., imagery provides a service technician with information required to service a vehicle, imagery illustrates to bystanders and/or other drivers that a vehicle brake light is not functioning, or the like). In certain aspects of the present disclosure, information about a vehicle system, such as wipers, can be indicative of rain or another condition, and the presented imagery can provide information such as advertisements that pertain to such condition. Such information can also be sent to other vehicles to enable imagery to be propagated across a network of vehicles.

One or more of the sensor(s) 124 can be configured to detect a change in a condition associated with the interior of the vehicle 102. For example, a sensor can be configured to detect a weight load in a driver's seat of the vehicle 102. Additionally or alternatively, a sensor can be configured to detect the position of a seat belt associated with the driver seat (e.g., whether the buckle is in a fastened position or an unfastened position). In this way, the sensor can be configured to collect data indicative of the whether a human driver is present in the vehicle 102 and/or whether one or more passengers are located in the vehicle and, if so, the seat locations where they are located. In certain aspects of the present disclosure, imagery can provide an indication as to which seat and/or door a user should enter the vehicle from, such as in the case of when the vehicle is part of a car pool.

In addition to the data acquired via the data acquisition system(s) 114, the vehicle computing system 108 can also be configured to obtain map data. For instance, a computing device of the vehicle 102 (e.g., within the autonomy system 116) can be configured to receive map data from one or more remote computing device(s). The map data can provide information regarding: the identity and location of different roadways, road segments, buildings, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, or other traffic control devices); and/or any other map data that provides information that assists the computing system in comprehending and perceiving its surrounding environment and its relationship thereto. Imagery displayed on the LIDAR system described herein can be based on a surrounding environment of the vehicle as determined by data acquisition system(s) 114 as described with respect to FIG. 4A.

The autonomy system 116 can be configured to control the operation of the vehicle 102 (e.g., to operate autonomously). For instance, the autonomy system 116 can obtain the data associated with the vehicle 102 (e.g., acquired by the data acquisition system(s) 114) and/or the map data. The autonomy system 116 can control various functions of the vehicle 102 based, at least in part, on the acquired data associated with the vehicle 102 and/or the map data. For example, the autonomy system 116 can include various models to perceive road features, signage, and/or objects (e.g., other vehicles, bikes, people, animals, etc.) based on the data acquired by the data acquisition system(s) 114, map data, and/or other data. The autonomy system 116 can be configured to predict the position and/or movement (or lack thereof) of such elements. The autonomy system 116 can be configured to plan the motion of the vehicle 102 based, at least in part, on such predictions.

The autonomy system 116 can implement the planned motion to appropriately navigate the vehicle 102 with minimal or no human intervention. For instance, the autonomy system 116 can determine a position and/or route for the vehicle 102 in real-time and/or near real-time. For instance, using acquired data, the autonomy system 116 can calculate one or more different potential vehicle routes (e.g., every fraction of a second). The autonomy system 116 can then select which route to take and cause the vehicle 102 to navigate accordingly. By way of example, the autonomy system 116 can calculate one or more different straight path(s) (e.g., including some in different parts of a current lane), one or more lane-change path(s), one or more turning path(s), and/or one or more stopping path(s). The vehicle 102 can select a path based, at last in part, based on an optimization algorithm that considers the costs of potential vehicle movements and seeks to determine optimized variables that make up the motion plan. Once selected, the autonomy system 116 can cause the vehicle 102 to travel according to the selected path by sending one or more control signals to the one or more vehicle control component(s) 118.

The vehicle control component(s) 118 can be configured to control the motion of the vehicle 102. For example, vehicle control component(s) 118 can include a steering component configured to control the heading and/or direction of the vehicle 102. Moreover, the vehicle control component(s) 118 can include a braking component configured to control the braking of the vehicle 102. The vehicle control component(s) 118 can include other components, such as an acceleration component configured to control the acceleration of the vehicle 102, a gear-shift component configured to control the gears of the vehicle 102, and/or other components (e.g., such as those associated with the vehicle's powertrain). The vehicle control components(s) 118 can be configured to receive signals indicating the planned motion of the vehicle 102 and control the vehicle 102 accordingly. Signals for controlling the vehicle control component(s) 118 in accordance with a motion plan can include, for example, signals turning one or more vehicle control component(s) 118 on and/or off, signals indicating a pedal position and/or pedal angle of an acceleration component and/or braking component, and/or signals indicating a position and/or angle of a steering component.

The control system 120 can be configured to display imagery on the LIDAR system. In some implementations, the control system 120 can be separate from one or more of the other on-board system(s). For example, the control system can be separate from the autonomy system 116 and/or separate from the vehicle control component(s) 118. In other implementations, the control system 120 can be integrated as part of one or more other on-board systems and/or computing devices. The control system 120 can include one or more computing device(s) (e.g., one or more microcontroller(s)). The computing device(s) can include one or more processor(s) and one or more memory devices (e.g., all on-board the vehicle 102). The one or more memory device(s) can store instructions that when executed by the one or more processor(s) cause the one or more processor(s) to perform operations, such as those for displaying imagery, as described herein. For example, in certain aspects of the present disclosure, the imagery can be configured to provide access to the vehicle, such as a pin code, QR code, pass key, challenge-response, or the like, which can be entered into a user device in communication with the vehicle control system 120 to authenticate the user.

In some implementations, imagery can be transferred to the user 128A from a different user 128B. For instance, the different user 128B can make a request for transportation services from the service provider. The operations computing system 104 can send imagery to a user device 128A associated with the different user 128B before, during, and/or after the vehicle 102 is assigned to the user's request. The different user 128B may transfer imagery to the user device 128A.

Figure 3:
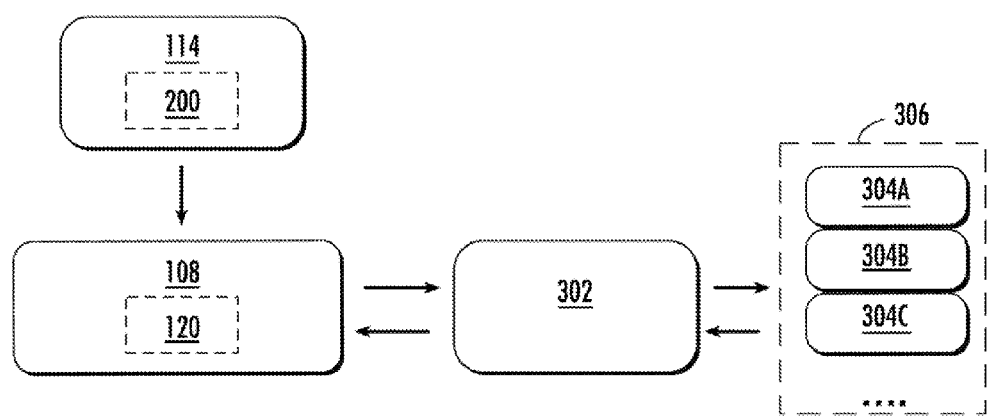
FIG. 3 depicts an example system overview according to example embodiments of the present disclosure.

FIG. 3 depicts the control system 120 for displaying imagery according to example embodiments of the present disclosure. As shown, the control system 120 can be configured to send signals to one or more controllers 302 that can cause one or more of the plurality of light emitting elements (304A-B-C) to illuminate for display based at least in part on a rotational frequency of the LIDAR device. For instance, one or more controllers 302 can send one or more signals to one or more drivers 306 associated with one or more respective light emitting elements, to illuminate such light emitting elements. The control system 120 can be configured such that the control system 120 receives and/or monitors any data provided by the controller(s) 302 and/or driver(s) 306 and/or light emitting elements (304A-B) (e.g., light not illuminating, driver not functioning, or the like) and adjusts accordingly.

Any suitable light emitting elements such as light emitting diodes (LEDs) or the like can be utilized and may or may not be in the visible light spectrum. The light emitting elements can be capable of different colors. In certain aspects of the present disclosure, projection LEDs can be utilized to project imagery on a surface (e.g., roadway, sidewalks, tunnel walls, or the like) away from the LIDAR device. In certain aspects of the present disclosure, brightness can be controlled by control system 120 by using a control signal (e.g., a pulse-width modulation signal) controlling the voltage to the light emitting element. Brightness can be adjusted based on ambient conditions (e.g., time of day, weather, or the like), maximum brightness allowed in an area based on laws or ordinances, the type of imagery being presented, or the like. Additionally, in certain implementations, the control system 120 can prevent the light emitting elements from appearing to flash when illuminated to display imagery, particularly when the LIDAR system is positioned on a vehicle in an area with laws or ordinances directed to flashing lights. For instance, if the LIDAR system is rotating at a speed which results in a strobe effect by the light emitting elements, additional light emitting elements may be illuminated.

The control system 120 is able to generate imagery by controlling illumination of each light emitting element individually. In addition, in certain aspects of the present disclosure, the light emitting elements 304A-B-C may be able to illuminate in two or more different colors and the control system is able to control color illumination for each color associated with each light emitting element. In this manner, one or more light emitting elements 304A-B-C (e.g. LEDs) may be illuminated to produce a first color, while one or more different light emitting elements are illuminated to produce a second color. One or more driver(s) 306 can be in communication with the one or more controller(s) 202 to control illumination of the light emitting elements. The controller(s) 302 can be any suitable type of controller and two or more controllers can be configured in a master/slave arrangement. In certain aspects of the present disclosure, a driver can be utilized in association with a predetermined number of light emitting elements. The light emitting elements can be rotated around a common axis of the LIDAR system. One full rotation is separated into a predetermined number of individual illumination cycles whereby each light emitting element is able to illuminate (in one or more different colors) to allow imagery to be generated on one or more surfaces of the LIDAR system. After an illumination cycle takes place, each of the one or more driver(s) can be loaded with new predetermined data to generate additional imagery in a second cycle. Based on the type of imagery to be displayed, data can be calculated and stored prior to be transmitted to the controller(s) and/or driver(s).

In certain aspects of the present disclosure, a rotational frequency of the LIDAR system can be determined by the vehicle computing system and can be utilized to determine the appropriate light emitting elements to illuminate during rotation of the LIDAR system to result in display of the desired imagery. In certain aspects of the present disclosure, data acquisition systems 114 can provide real-time rotational frequency information for a LIDAR system associated with a vehicle's autonomy system 116. Such information can be used to control illumination of light emitting elements positioned on such LIDAR system. In certain aspects of the present disclosure, predetermined or preset rotational frequency information for a LIDAR system can be utilized. For example, in certain aspects of the present disclosure, active determination (e.g., measuring the real-time rotation of the LIDAR system and controlling illumination of one or more of the light emitting elements based on the measured rotation) can be utilized. In certain aspects of the present disclosure, passive determination (e.g., using a predetermined or preset rotational frequency for the rotation of the LIDAR system, even if the LIDAR system fluctuates from such predetermined/preset rotational frequency) can be utilized. For example, in certain aspects of the present disclosure, a LIDAR system rotates at about 550 rpm to about 650 rpm. The control system 120 can determine illumination of each light emitting element based on the range of rotational frequency and the desired imagery, such as by taking an average of the rotational frequency or by adjusting the illumination based on the range of frequency.

Figure 5:
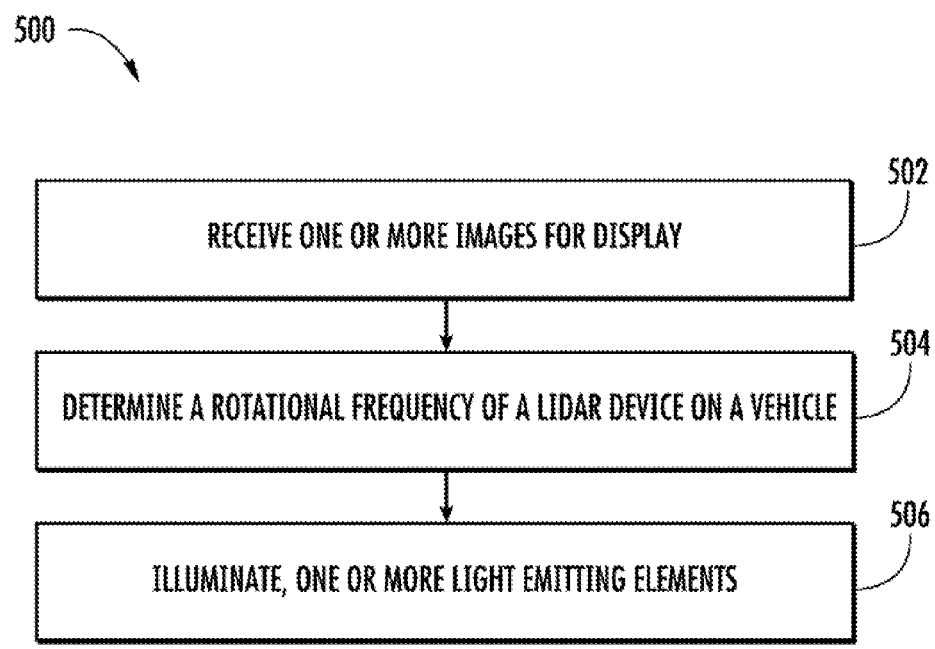
FIG. 5 depicts a flow diagram of an example method for imagery display on a LIDAR system according to example embodiments of the present disclosure.
Figure 6:
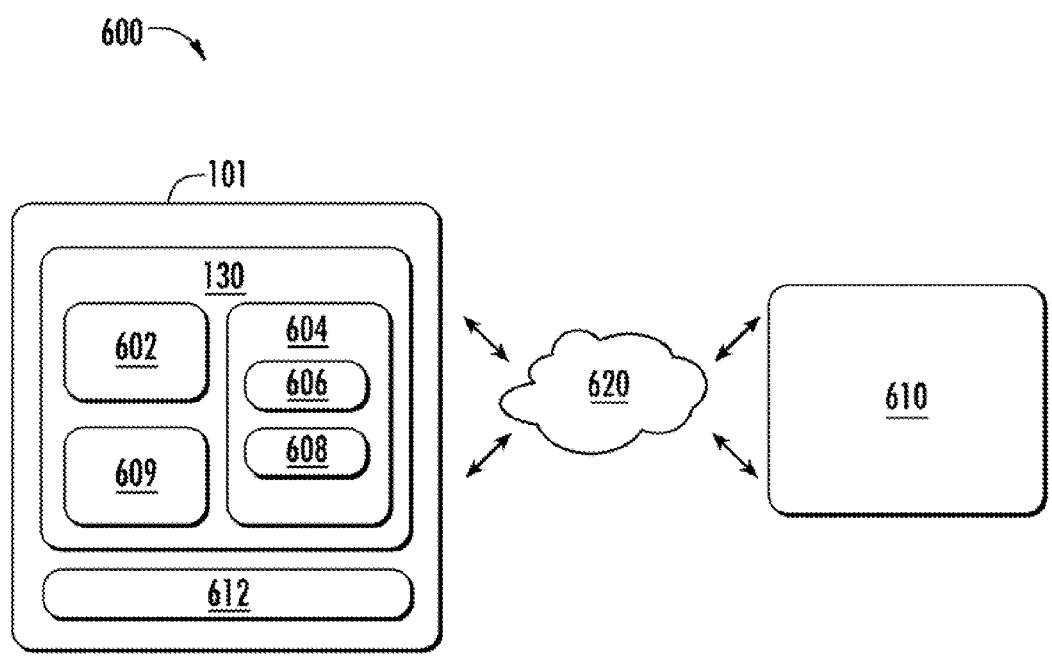
FIG. 6 depicts an example system overview according to example embodiments of the present disclosure.

FIG. 5 depicts a flow diagram of an example method 500 of displaying imagery according to example embodiments of the present disclosure. One or more portion(s) of the method 300 can be implemented by one or more computing device(s) such as, for example, the computing device(s) 104 and 108 shown in FIGS. 1 and 602 as shown in FIG. 6. Moreover, one or more portion(s) of the method 500 can be implemented as an algorithm on the hardware components of the device(s) described herein (e.g., as in FIGS. 1, 3, and 6) to, for example, display imagery on a LIDAR system of a vehicle. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 300 can include receiving, one or more images for display. For instance, The vehicle computing system 108 and/or remote computing device(s) 104 can receive, from a user device 126A associated with a user 128A, imagery to be displayed.

At (502), the method 500 can include determining a rotational frequency of a LIDAR device located on a vehicle.

At (506), the method 500 can include illuminating one or more of a plurality of light emitting elements coupled to the LIDAR device based at least in part on the rotational frequency of the LIDAR device and the one or more images for display.

FIG. 6 depicts an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include the vehicle computing system 101 of the vehicle 102 and, in some implementations, a remote computing system 610 including remote computing device(s) that is remote from the vehicle 102 (e.g., the operations computing system 104) that can be communicatively coupled to one another over one or more networks 620. The remote computing system 610 can be associated with a central operations system and/or an entity associated with the vehicle 102 such as, for example, a vehicle owner, vehicle manager, fleet operator, service provider, etc.

The computing device(s) 130 of the vehicle computing system 101 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 102 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 102 can store instructions 606 that when executed by the one or more processors 602 on-board the vehicle 102 cause the one or more processors 602 (the computing system 101) to perform operations such as any of the operations and functions of the computing device(s) 130 or for which the computing device(s) 130 are configured, as described herein such as for displaying imagery on a vehicle.

The memory 604 can store data 608 that can be obtained, received, accessed, written, manipulated, created, and/or stored. The data 608 can include, for instance, imagery data, as described herein. In some implementations, the computing device(s) 130 can obtain data from one or more memory device(s) that are remote from the vehicle 102.

The computing device(s) 130 can also include a communication interface 609 used to communicate with one or more other system(s) on-board the vehicle 102 and/or a remote computing device that is remote from the vehicle 102 (e.g., of remote computing system 610). The communication interface 609 can include any circuits, components, software, etc. for communicating with one or more networks (e.g., 620). In some implementations, the communication interface 609 can include including for example, one or more of a communications controller, receiver, transceiver, transmitter, port, conductors, software and/or hardware for communicating data.

In some implementations, the vehicle computing system 101 can further include a positioning system 612. The positioning system 612 can determine a current position of the vehicle 102. The positioning system 612 can be any device or circuitry for analyzing the position of the vehicle 102. For example, the positioning system 612 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 102 can be used by various systems of the vehicle computing system 100.

The network(s) 620 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the vehicle computing system 101. The remote computing devices can include components (e.g., processor(s), memory, instructions, data) similar to that described herein for the computing device(s) 130. Moreover, the remote computing system 610 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising;
receiving, by one or more computing devices, one or more images for display;
determining, by the one or more computing devices, a rotational frequency of a LIDAR device located on a vehicle; and
illuminating based at least in part on the rotational frequency of the LIDAR device and the one or more images for display, by the one or more computing devices, one or more of a plurality of light emitting elements positioned on a rotatable portion of the LIDAR device, wherein the one or more of the plurality of light emitting elements rotate at the rotational frequency of the LIDAR device and illuminate to display imagery associated with the one or more images for display.

2. The computer-implemented method of claim 1, further comprising selecting, by the one or more computing devices, the one or more images for display, wherein the one or more images for display are associated with a user of a transport service associated with the vehicle.

3. The computer-implemented method of claim 2, wherein the one or more images for display are selected based at least in part on predefined preferences of the user accessible by the one or more computing devices.

4. The computer-implemented method of claim 2, wherein the one or more images for display are selected based at least in part on a request for the transport service by the user.

5. The computer-implemented method of claim 4, wherein the one or more images for display are selected based at least in part on a state of the vehicle in response to the request for the transport service, the state of the vehicle comprising at least one of i) the vehicle traveling to a pickup location of the user, ii) the vehicle approaching the pickup location of the user, iii) the vehicle being positioned within a predetermined distance of the pickup location of the user, or iv) the vehicle being positioned within the predetermined distance of the pickup location of the user and being stationary for a predetermined amount of time.

6. The computer-implemented method of claim 1, further comprising determining, by the one or more computing devices, the one or more images for display based at least in part on a surrounding environment of the vehicle.

7. The computer-implemented method of claim 1, wherein the one or more images for display comprise advertising, news, artwork, or combinations thereof.

8. A computing system for displaying imagery, comprising:
one or more processors; and
one or more tangible, non-transitory, computer readable media that collectively store instructions that when executed by the one or more processors cause the computing system to perform operations, the operations comprising:
receiving one or more images for display;
determining a rotational frequency of a LIDAR device located on a vehicle; and
illuminating, based at least in part on the rotational frequency of the LIDAR device and the one or more images for display, one or more of a plurality of light emitting elements positioned on a rotatable portion of the LIDAR device, wherein the one or more of the plurality of light emitting elements rotate at the rotational frequency of the LIDAR device and illuminate to display imagery associated with the one or more images for display.

9. The computing system of claim 8, wherein the operations further comprise selecting the one or more images for display, wherein the one or more images for display are associated with a user of a transport service associated with the vehicle.

10. The computing system of claim 9, wherein the one or more images for display are selected based at least in part on predefined preferences of the user accessible by the one or more computing devices.

11. The computing system of claim 8, wherein the one or more images for display are selected based at least in part on a request for the transport service by the user.

12. The computing system of claim 11, wherein the one or more images for display are selected based at least in part on a state of the vehicle in response to the request for the transport service, the state of the vehicle comprising at least one of i) the vehicle traveling to a pickup location of the user, ii) the vehicle approaching the pickup location of the user, iii) the vehicle being positioned within a predetermined distance of the pickup location of the user, or iv) the vehicle being positioned within the predetermined distance of the pickup location of the user and being stationary for a predetermined amount of time.

13. The computing system of claim 8, wherein the operations further comprise determining the one or more images for display based at least in part on a surrounding environment of the vehicle.

14. The computing system of claim 8, wherein the one or more images for display comprise advertising, news, artwork, or combinations thereof.

15. A display apparatus, comprising:
one or more support elements positioned on a rotational portion of a LIDAR device capable of rotational movement; a plurality of light emitting elements positioned on the one or more support elements and
one or more controllers in communication with the plurality of light emitting elements and configured to cause one or more of the plurality of light emitting elements to illuminate for display based at least in part on a rotational frequency of the LIDAR device, wherein the one or more of the plurality of light emitting elements rotate at the rotational frequency of the LIDAR device and illuminate to display imagery associated with one or more images for display.

16. The display apparatus of claim 15, wherein the one or more controllers are configured to communicate with one or more computing devices to receive the one or more images for display from the one or more computing devices.

17. The display apparatus of claim 16, wherein the one or more controllers are configured to cause one or more of they plurality of light emitting elements to illuminate for display based at least in part on the one or more images for display.

18. The display apparatus of claim 15, wherein the plurality of light emitting elements comprise light emitting diodes.

19. The display apparatus of claim 18, wherein the one or more controllers comprise one or more drivers.

20. The display apparatus of claim 15, wherein the one or more support, elements are configured to be coupled to a housing of the LIDAR device such that the one or more light emitting elements are visible.

* * * * *